United States Patent
Akbas

(10) Patent No.: US 8,920,134 B2
(45) Date of Patent: Dec. 30, 2014

(54) SOFT-START HERMETIC COMPRESSOR

(75) Inventor: Omer Akbas, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 543 days.

(21) Appl. No.: 13/381,068

(22) PCT Filed: Aug. 27, 2010

(86) PCT No.: PCT/EP2010/062592
§ 371 (c)(1),
(2), (4) Date: Dec. 27, 2011

(87) PCT Pub. No.: WO2011/023809
PCT Pub. Date: Mar. 3, 2011

(65) Prior Publication Data
US 2012/0107154 A1    May 3, 2012

(30) Foreign Application Priority Data
Aug. 31, 2009   (TR) ............... A 2009/06689

(51) Int. Cl.
*F04B 39/00* (2006.01)
*F16H 41/00* (2006.01)
*F16D 33/06* (2006.01)
*F04B 39/02* (2006.01)
*F04B 53/18* (2006.01)
*F04C 29/00* (2006.01)
(Continued)

(52) U.S. Cl.
CPC ............. *F04B 39/0246* (2013.01); *F16H 41/30* (2013.01); *F16D 33/06* (2013.01); *F04B 39/0094* (2013.01); *F04B 39/023* (2013.01); *F04B 39/0253* (2013.01); *F04B 53/18* (2013.01); *F04C 23/008* (2013.01); *F04C 29/005* (2013.01); *F16H 41/04* (2013.01); *F04B 39/122* (2013.01); *F16H 41/00* (2013.01)
USPC ............................. 417/319; 60/330; 60/339

(58) Field of Classification Search
CPC ............. F04B 39/0246; F04B 39/0253; F04D 13/022; F04D 13/023; F16D 33/06; F16D 35/027; F16H 41/00; F16H 41/22
USPC ............................. 417/223, 319; 60/330, 339
See application file for complete search history.

(56) References Cited

U.S. PATENT DOCUMENTS 3,873,244 A * 3/1975 Jaggi .................... 417/423.6
3,951,242 A * 4/1976 Fischer et al. ............ 188/296
(Continued)

FOREIGN PATENT DOCUMENTS

DE   102005004524 B3   5/2006
WO   2007045330 A2    4/2007
(Continued)

*Primary Examiner* — Charles Freay
*Assistant Examiner* — Philip Stimpert
(74) *Attorney, Agent, or Firm* — Venjuris PC

(57) ABSTRACT

The present invention relates to a hermetic compressor (1) used in operating cooling devices like the refrigerator, comprising a casing (2) carrying the elements therein, an oil sump (3) forming the lower portion of the casing (2) and wherein oil (Y) is put providing the lubrication of the movable elements, an electric motor having a rotor (4) and a stator, a piston (5) providing the delivery of the refrigerant fluid in pressurized state to the refrigeration system, a cylinder block (6) wherein the piston (5) operates, a crankshaft (7) delivering the rotational movement of the rotor (4) to the piston (5) by changing it to linear movement and an oil pickup tube (9) mounted to the core of the rotor (4), the lower end of which is immersed into the oil (Y) in the oil sump (3) and the upper end extending upwards from the middle of the rotor (4) and which delivers the oil (Y) to the crankshaft (7) by sucking from the oil sump (3) and a hydrodynamic coupling (10) that transfers the rotational movement of the rotor (4) to the crankshaft (7).

10 Claims, 2 Drawing Sheets

Figure 1:
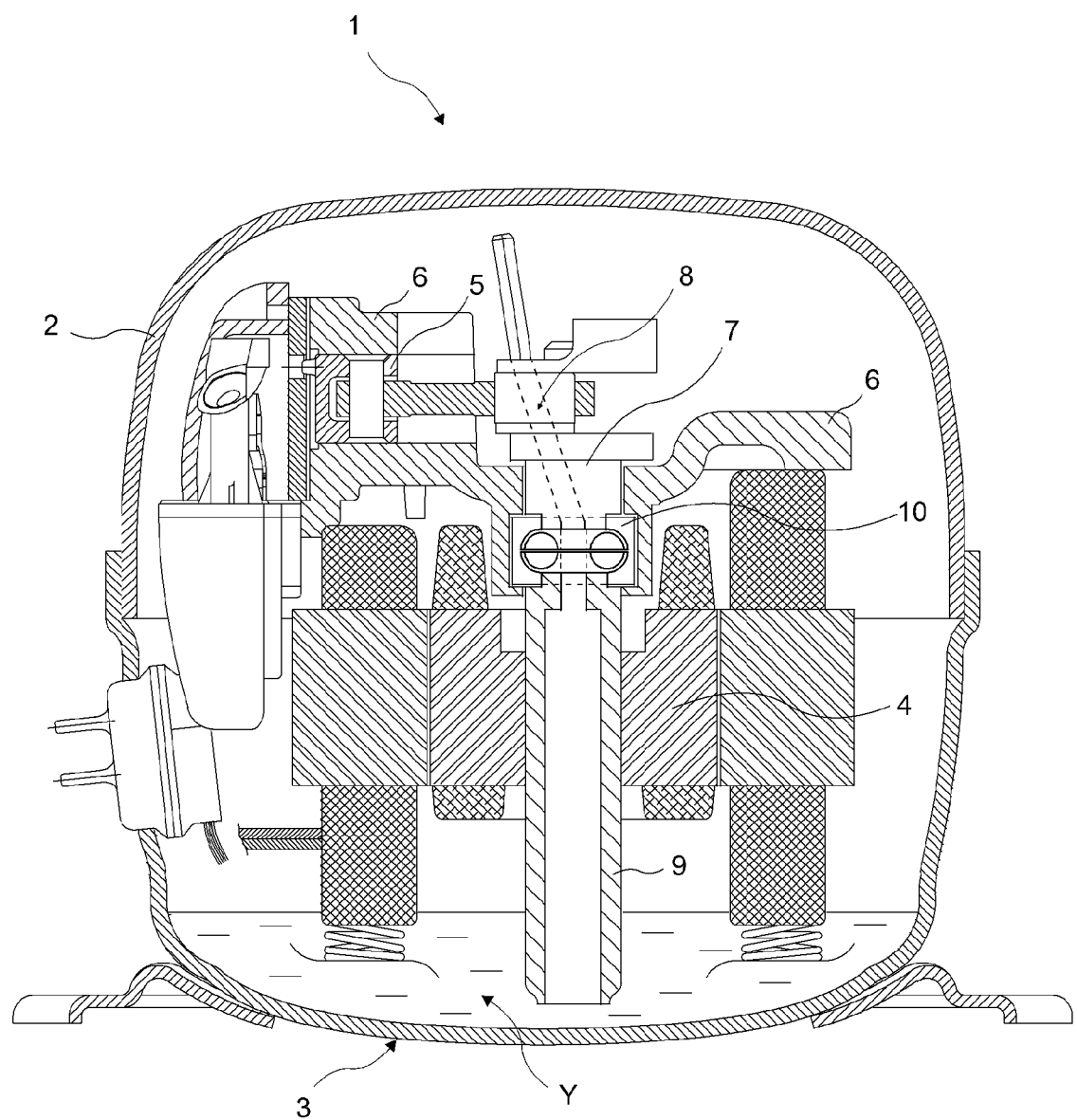

(51) Int. Cl.
*F04B 39/12* (2006.01)
*F16H 41/30* (2006.01)
*F04C 23/00* (2006.01)
*F16H 41/04* (2006.01)

(56) References Cited

U.S. PATENT DOCUMENTS

| | | |
|---|---|---|
| 4,834,627 A | 5/1989 | Gannaway |
| 6,164,940 A | 12/2000 | Terauchi et al. |
| 6,463,740 B1 * | 10/2002 | Schmidt et al. ................. 60/772 |
| 2006/0225412 A1 | 10/2006 | Adleff |
| 2008/0245634 A1 * | 10/2008 | Basteck et al. ................. 192/3.3 |

FOREIGN PATENT DOCUMENTS

| | | | |
|---|---|---|---|
| WO | 2008052297 | A1 | 5/2008 |
| WO | 2009056529 | A1 | 5/2009 |

* cited by examiner

SOFT-START HERMETIC COMPRESSOR

The present invention relates to a reciprocating hermetic compressor wherein the effect of the inertial forces during the start is decreased.

The operation of the reciprocating hermetic compressors used in refrigerators is realized in two stages, the start and the continuous operation. The compressor motor reaches the speed of around 3000 rpm in 0.5 seconds only during the start and consumes approximately 1650 VA power. The speed of the compressor motor in the continuous operation following the start stays around 3000 rpm in average and the electrical power consumed decreases approximately to 165 Watts. The proportion between the power consumed in the start and continuous operation is almost the same for hermetic compressors of different capacities. The hermetic compressors are basically composed of a mechanical movement group including the piston, piston rod and the crankshaft and an electric motor that drives the mechanical movement group. The crankshaft is joined snap-fittingly with the rotor core and receives its movement from the rotor in the rate of 1:1. Since the rotor rotates the crankshaft directly, in the start phase at the passage from the stop period to the operation period, it also compensates the inertial force of the crankshaft and the piston rod and piston whereto the crankshaft is connected, the electric motor consumes about 10 times more power during the start compared to the continuous operation state. The capacity of the electric motor is determined in order to compensate the load at the start, however in the course of the continuous operation after the start, it has to operate under much lower capacity. Therefore, the motors dimensioned according to the start conditions lead to increase in costs and decrease in efficiency. In the International Patent Application No WO2007045330, a hydrodynamic coupling is explained which comprises an impeller and a turbine and wherein a toroidal working chamber is formed between the impeller and the turbine.

The aim of the present invention is the realization of a hermetic compressor which is enabled to make a soft start by decreasing the effect of inertial forces of the elements such as the crankshaft, piston rod, and the piston during the start.

The hermetic compressor realized in order to attain the aim of the present invention comprises an oil pickup tube mounted to the rotor core in the upright position, that sucks the oil at the lower portion of the casing, delivering to the movable elements at the upper side and a crankshaft that is positioned at the upper side of the rotor, not directly connected to the rotor and the transfer of movement from the rotor to the crankshaft is achieved by a hydrodynamic coupling.

The hydrodynamic coupling is connected between the upper end of the oil pickup tube extending upwards from the middle of the rotor and the lower end of the crankshaft.

The hydrodynamic coupling transfers the rotational movement of the rotor from the oil pickup tube rotated by the rotor to the crankshaft. Beginning from the moment the rotor starts, the transfer of movement to the crankshaft is realized only after the oil sucked by the oil pickup tube from the oil sump in the lower portion of the casing reaches the hydrodynamic coupling at the upper end of the oil pickup tube. Consequently, it is no longer necessary to compensate the inertial forces of the crankshaft, piston rod and the piston at the initial start of the rotor Since the oil level contained in the oil sump is lower than the level of the hydrodynamic coupling fastened to the upper portion of the rotor, only the rotor rotates at the initial start of the rotor, the hydrodynamic coupling is idle and the crankshaft waits motionless since the oil has not yet reached the hydrodynamic coupling. The oil sucked from the bottom upwards by the oil pickup tube slowly fills in the hydrodynamic coupling and thus the movement is transferred to the crankshaft after a specific time period from the initial start of the rotor.

The hydrodynamic coupling comprises an impeller connected to the upper end of the oil pickup tube, receiving its movement from the oil pickup tube that the rotor rotates and which is at the same time supplied with the oil sucked from the oil sump by the oil pickup tube and a turbine connected to the crankshaft at its upper side. The turbine provides the rotation of the crankshaft with the kinetic energy transferred from the oil which is activated by the impeller. The hydrodynamic coupling furthermore comprises a working chamber situated between the impeller and the turbine that provides the kinetic energy to be transferred from the impeller to the turbine when filled with oil and the transfer of kinetic energy from the impeller to the turbine to be interrupted when the oil contained therein is discharged.

In an embodiment of the present invention, the hydrodynamic coupling comprises an oil inlet hole which extends from the bottom upwards in the middle of the impeller below and the lower end of which opens to the oil pickup tube and the upper end to the working chamber, which provides the oil delivered by the oil pickup tube to be filled into the working chamber during operation of the rotor and the oil in the working chamber to be emptied downwards into the oil pickup tube during the stop of the rotor.

In another embodiment of the present invention, the hydrodynamic coupling comprises an oil outlet hole situated in the middle of the turbine above and the lower end of which opens to the working chamber and the upper end to the lubrication channel at the crankshaft, which provides the oil to continue its upward movement after filling in the working chamber and to pass into the lubrication channel at the crankshaft during operation of the rotor.

In another embodiment of the present invention, the hydrodynamic coupling is positioned at the upper side of the rotor by being supported at the portion of the cylinder block extending to the upper side of the rotor and supporting the crankshaft.

By means of the hydrodynamic coupling, the hermetic compressor is provided to start softly, without requiring the overcoming of the inertial forces of the crankshaft and the movable elements like the piston at the start of the rotor.

Figure 2:
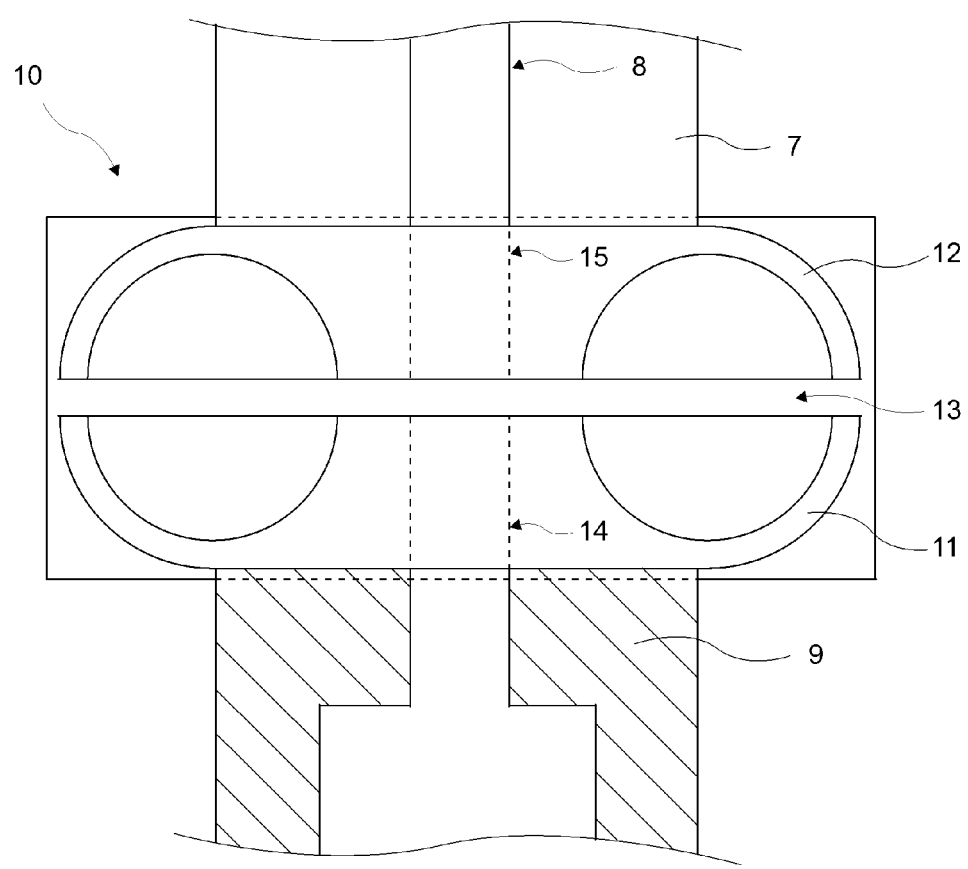

The compressor realized in order to attain the aim of the present invention is illustrated in the attached figures, where:

FIG. 1—is the schematic view of a hermetic compressor.
FIG. 2—is the schematic view of a hydrodynamic coupling.

The elements illustrated in the figures are numbered as follows:
1. Hermetic compressor
2. Casing
3. Oil sump
4. Rotor
5. Piston
6. Cylinder
7. Crankshaft
8. Lubrication channel
9. Oil pickup tube
10. Hydrodynamic coupling
11. Impeller
12. Turbine
13. Working chamber
14. Oil inlet hole
15. Oil outlet hole The hermetic compressor (1) comprises a casing (2) carrying the elements therein, an oil sump (3) forming the lower portion of the casing (2) and wherein oil (Y) is put to provide the lubrication of the movable elements, an electric motor having a rotor (4) and a stator, a piston (5) providing the delivery of the refrigerant fluid in pressurized state to the refrigeration system, a cylinder block (6) disposed at the upper side of the rotor (4) wherein the piston (5) operates, a crankshaft (7), which is supported by the cylinder block (6), delivering the rotational movement of the rotor (4) to the piston (5) by changing to linear movement and comprising a lubrication channel (8) providing the delivery of the oil (Y) to the movable elements contained in the casing (2) at the upper side of the rotor (4), and an oil pickup tube (9) mounted to the rotor (4) by press-fit assembling method, the lower end of which is immersed into the oil (Y) in the oil sump (3) and the upper end extending from the middle of the rotor (4) upwards and which delivers the oil (Y) to the crankshaft (7) by sucking from the oil sump (3).

The hermetic compressor (1) of the present invention comprises a hydrodynamic coupling (10) that transfers the rotational movement of the rotor (4) from the oil pickup tube (9) to the crankshaft (7) by being connected between the upper end of the oil pickup tube (9) and the lower end of the crankshaft (7).

The hydrodynamic coupling (10) comprises an impeller (11) connected to the upper end of the oil pickup tube (9), receiving its movement from the oil pickup tube (9) rotated by the rotor (4) and fed by the oil (Y) sucked from the oil sump (3) by the oil pickup tube (9), a turbine (12) connected to the crankshaft (7), that provides the rotation of the crankshaft (7) with the kinetic energy transferred from the oil (Y) activated by the impeller (11) and a working chamber (13) disposed between the impeller (11) and the turbine (12), providing the transfer of the kinetic energy from the impeller (11) to the turbine (12) when filled with oil (Y) and to interrupt transfer of kinetic energy from the impeller (11) to the turbine (12) when the oil (Y) contained therein is discharged.

In the hermetic compressor (1), the crankshaft (7) is not directly connected to the rotor (4) and the transfer of movement between the rotor (4) and the crankshaft (7) is provided by the hydrodynamic coupling (10). Thus, the rotor (4) does not try to rotate the crankshaft (7) at the initial start, the rotor (4) runs idle without load until the oil (7) sucked from the oil sump (3) by the oil pickup tube (9) reaches the hydrodynamic coupling (10). During this time period, the impeller (11) connected to the rotor (4) by means of the oil pickup tube (9) rotates but the turbine (12) connected to the crankshaft (7) does not rotate. A specific time period after the start of the rotor (4), the working chamber (13) between the impeller (11) and the turbine (12) in the hydrodynamic coupling (10) starts to be filled with the oil (Y) sucked and delivered from the oil sump (3) by the oil pickup tube (9) and as the fullness quantity of oil (Y) in the working chamber (13) increases, the transfer of torque from the impeller (11) to the turbine (12) increases and the transfer of maximum torque from the impeller (11) to the turbine (12) is realized after the working chamber (13) is completely filled with oil (Y). In every stop period of the hermetic compressor (1), the oil (Y) filled into the hydrodynamic coupling (10) in the previous operation period is discharged from the working chamber (13) into the oil sump (3) by means of the oil pickup tube (9) and the effect of gravity and thus the hydrodynamic connection between the impeller (11) and the turbine (12) is interrupted to prepare for the next operation period of the rotor (4)

Consequently, during the initial starting movement of the rotor (4) a soft start phase is realized without compensating the inertial forces of the crankshaft (7) and the piston (5), the electrical power drawn from the mains in the start phase remains almost at the same level as in the continuous operation state.

In an embodiment of the present invention, the hydrodynamic coupling (10) comprises an oil inlet hole (14) situated in the center of the impeller (11) and the lower end of which opens into the oil pickup tube (9) and the upper end which opens into the working chamber (13), and that provides the oil (Y) carried by the oil pickup tube (9) to fill into the working chamber (13) during operation period of the rotor (4) and the oil (Y) in the working chamber (13) to be discharged into the oil pickup tube (9) during the stop period of the rotor (4).

The oil (Y) sucked from the oil sump (3) by the oil pickup tube (9) during rotational movement of the rotor (4), continues its upwards movement, passes from the oil inlet hole (14) and fills into the working chamber (13) between the impeller (11) and the turbine (12). The oil (Y) filling the working chamber (13) in the operation period of the rotor (4), flows downwards due to the effect of the gravity when the rotor (4) stops and is discharged into the oil pickup tube (9) and into the oil sump (3) from the oil pickup tube (9) by means of the inlet hole (14).

In another embodiment of the present invention, the hydrodynamic coupling (10) comprises an oil outlet hole (15) situated in the center of the turbine (12), and the lower end of which opens to the working chamber (13) and the upper end to the lubrication channel (8) at the crankshaft (7), and during operation period of the rotor (4) that provides the oil (Y) to continue its upward movement after filling the working chamber (13) to pass into the lubrication channel (8) and thus provides the oil (Y) besides serving to operate the hydrodynamic coupling (10) to also continue serving to lubricate the other movable elements in the casing (2).

In another embodiment of the present invention, the hydrodynamic coupling (10) is supported at the portion of the cylinder block (6) extending to the upper side of the rotor (4) and supporting the crankshaft (7).

In the hermetic compressor (1) of the present invention, by means of the hydrodynamic coupling (10), the start of the rotor (4) is realized independently from the crankshaft (7) and the piston (5), in other words, overcoming the inertial forces of the crankshaft (7) and the piston (5) is not necessary at the initial start of the rotor (4). In the start phase lasting from the moment the rotor (4) starts to rotate until reaching the maximum speed, the oil (Y) sucked by the oil pickup tube (9) reaches the hydrodynamic coupling (10), the transfer of movement is realized with the ever increasing torque between the impeller (11) and the turbine (12) depending on the amount of oil (Y) slowly filling into the working chamber (13) by being sucked from the bottom upwards and thus, the hermetic compressor (1) is provided to start softly, the efficiency is increased, the consumed energy is decreased and the working life is extended.

It is to be understood that the present invention is not limited by the embodiments disclosed above and a person skilled in the art can easily introduce different embodiments. These should be considered within the scope of the protection postulated by the claims of the present invention.

The invention claimed is:
1. A hermetic compressor (1) comprising a casing (2) carrying movable elements
therein, an oil sump (3) forming the lower portion of the casing (2) and wherein oil (Y) is put providing the lubrication of the movable elements, an electric motor having a rotor (4) and a stator, a piston (5) providing the delivery of a refrigerant fluid in pressurized state to a refrigeration system, a cylinder block
(6) disposed at the upper side of the rotor (4), a crankshaft (7) supported by the cylinder block (6), and an oil pickup tube (9) mounted to the rotor (4) by press-fit assembling method, the lower end of which is immersed into the oil (Y) in the oil sump (3) and which delivers the oil (Y) to the crankshaft (7) by sucking from the oil sump (3), and characterized by a hydrodynamic coupling (10) that transfers the rotational movement of the rotor (4) from the oil pickup tube (9) to the crankshaft (7) by being connected between the upper end of the oil pickup tube (9) and the lower end of the crankshaft (7), wherein the hydrodynamic coupling is fed by the oil sucked from the oil sump by the oil pickup tube.

2. The hermetic compressor (1) as in claim 1, characterized by the hydrodynamic coupling (10) comprising an impeller (11) fastened to the upper end of the oil pickup tube (9), receiving its movement from the oil pickup tube (9) rotated by the rotor (4) and fed by the oil (Y) sucked from the oil sump (3) by the oil pickup tube (9), a turbine (12) providing the rotation of the crankshaft (7) and a working chamber (13) disposed between the impeller (11) and the turbine (12).

3. The hermetic compressor (1) as in claim 2, characterized by the hydrodynamic coupling (10) comprising an oil inlet hole (14) situated in the center of the impeller (11) and the lower end of which opens into the oil pickup tube (9) and the upper end of which opens into the working chamber (13), providing the oil (Y) carried by the oil pickup tube (9) to fill into the working chamber (13) during operation period of the rotor (4) and the oil (Y) in the working chamber (13) to be discharged into the oil pickup tube (9) during the stop period of the rotor (4).

4. The hermetic compressor (1) as in claim 2, characterized by the crankshaft
(7) comprising a lubrication channel (8) providing the delivery of the oil (Y) to the movable elements situated in the casing (2) and the hydrodynamic coupling (10) comprising an oil outlet hole (15) situated in the center of the turbine (12), and the lower end of which opens into the working chamber (13)

and the upper end which opens into the lubrication channel (8) and providing the oil (Y) to continue its upward movement after filling in the working chamber (13) to pass into the lubrication channel (8) during operation of the rotor (4).

5. The hermetic compressor (1) as in claim 1, characterized by the hydrodynamic coupling (10) supported at the portion of the cylinder block (6) extending to the upper side of the rotor (4) and supporting the crankshaft (7).

6. The hermetic compressor (1) as in claim 3, characterized by the crankshaft
(7) comprising a lubrication channel (8) providing the delivery of the oil (Y) to the movable elements situated in the casing (2) and the hydrodynamic coupling (10) comprising an oil outlet hole (15) situated in the center of the turbine (12), and the lower end of which opens into the working chamber (13)

and the upper end which opens into the lubrication channel (8) and providing the oil (Y) to continue its upward movement after filling in the working chamber (13) to pass into the lubrication channel (8) during operation of the rotor (4).

7. The hermetic compressor (1) as in claim 2, characterized by the hydrodynamic coupling being (10) supported at the portion of the cylinder block (6) extending to the upper side of the rotor (4) and supporting the crankshaft (7).

8. The hermetic compressor (1) as in claim 3, characterized by the hydrodynamic coupling being (10) supported at the portion of the cylinder block (6) extending to the upper side of the rotor (4) and supporting the crankshaft (7).

9. The hermetic compressor (1) as in claim 4, characterized by the hydrodynamic coupling being (10) supported at the portion of the cylinder block (6) extending to the upper side of the rotor (4) and supporting the crankshaft (7).

10. The hermetic compressor (1) as in claim 6, characterized by the hydrodynamic coupling being (10) supported at the portion of the cylinder block (6) extending to the upper side of the rotor (4) and supporting the crankshaft (7).

\* \* \* \* \*